(12) United States Patent
Cruz-Hernandez et al.

(10) Patent No.: US 10,248,213 B2
(45) Date of Patent: *Apr. 2, 2019

(54) SYSTEMS AND METHODS FOR INTERFACES FEATURING SURFACE-BASED HAPTIC EFFECTS

(71) Applicant: Immersion Corporation, San Jose, CA (US)

(72) Inventors: Juan Manuel Cruz-Hernandez, Montreal (CA); Danny A. Grant, Laval (CA); Ali Modarres, Montreal (CA); Andrew Gosline, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,359

(22) Filed: May 24, 2018

(65) Prior Publication Data
US 2018/0267613 A1   Sep. 20, 2018

Related U.S. Application Data

(63) Continuation of application No. 12/696,908, filed on Jan. 29, 2010, now Pat. No. 10,007,340.
(Continued)

(51) Int. Cl.
*G06F 3/01* (2006.01)
*G06F 3/0488* (2013.01)
(Continued)

(52) U.S. Cl.
CPC ............ *G06F 3/016* (2013.01); *G06F 3/017* (2013.01); *G06F 3/0488* (2013.01); *G06T 15/04* (2013.01);
(Continued)

(58) Field of Classification Search
None
See application file for complete search history.

(56) References Cited

U.S. PATENT DOCUMENTS

| | | | |
|---|---|---|---|
| 5,144,187 | A | 9/1992 | Culp |
| 5,198,732 | A | 3/1993 | Morimoto |

(Continued)

FOREIGN PATENT DOCUMENTS

| | | |
|---|---|---|
| CN | 1646833 | 7/2005 |
| CN | 1924775 A | 3/2007 |

(Continued)

OTHER PUBLICATIONS

"2004 UBC CS Technical Report Abstracts", The ICICS/CS Reading Room, Retrieved from http://www.cs.ubc.ca/cgi-bin/tr/2004/ful, 2004, pp. 1-5.
(Continued)

*Primary Examiner* — Chico A Foxx
(74) *Attorney, Agent, or Firm* — Kilpatrick Townsend & Stockton LLP

(57) ABSTRACT

Systems and methods for interfaces featuring surface-based haptic effects are described. One described system includes a sensor configured to detect a touch in a touch area when an object contacts a touch surface. The touch surface may correspond to the display area or may correspond to a non-display surface of a computing device or peripheral interfaced to a computing device. The system can further include an actuator in communication with the processor and coupled to the touch surface, the actuator configured to output a haptic effect and a processor configured to select a haptic effect to generate. The haptic effect can be selected based on a position of the touch and recognizing an input gesture provided by the touch and/or content displayed in a graphical user interface at a location mapped to a position in the touch area at or near the touch. The haptic effect may
(Continued)

provide a texture, simulate an obstacle, and/or adjust the coefficient of friction of the surface.

20 Claims, 7 Drawing Sheets

Related U.S. Application Data

(60) Provisional application No. 61/159,482, filed on Mar. 12, 2009, provisional application No. 61/262,041, filed on Nov. 17, 2009, provisional application No. 61/262,038, filed on Nov. 17, 2009.

(51) Int. Cl.
*G06T 15/04* (2011.01)
*G08B 6/00* (2006.01)
*G06F 3/0346* (2013.01)

(52) U.S. Cl.
CPC .... *G06F 3/0346* (2013.01); *G06F 2200/1637* (2013.01); *G06F 2203/014* (2013.01); *G08B 6/00* (2013.01)

(56) References Cited

U.S. PATENT DOCUMENTS

| | | | |
|---|---|---|---|
| 5,691,898 A | 11/1997 | Rosenberg et al. | |
| 5,709,219 A | 1/1998 | Chen et al. | |
| 5,734,373 A | 3/1998 | Rosenberg et al. | |
| 5,767,839 A | 6/1998 | Rosenberg | |
| 5,844,392 A | 12/1998 | Peurach et al. | |
| 5,897,569 A | 4/1999 | Kellogg et al. | |
| 5,939,816 A | 8/1999 | Culp | |
| 5,952,806 A | 9/1999 | Muramatsu | |
| 5,956,484 A | 9/1999 | Rosenberg et al. | |
| 5,959,613 A | 9/1999 | Rosenberg et al. | |
| 6,028,593 A | 2/2000 | Rosenberg et al. | |
| 6,046,527 A | 4/2000 | Roopnarine et al. | |
| 6,046,730 A | 4/2000 | Bowen et al. | |
| 6,084,587 A | 7/2000 | Tarr et al. | |
| 6,088,019 A | 7/2000 | Rosenberg | |
| 6,131,097 A | 10/2000 | Peurach et al. | |
| 6,147,674 A | 11/2000 | Rosenberg et al. | |
| 6,169,540 B1 | 1/2001 | Rosenberg et al. | |
| 6,175,180 B1 | 1/2001 | Angelini et al. | |
| 6,219,032 B1 | 4/2001 | Rosenberg et al. | |
| 6,252,579 B1 | 6/2001 | Rosenberg et al. | |
| 6,285,351 B1 | 9/2001 | Chang et al. | |
| 6,292,170 B1 | 9/2001 | Chang et al. | |
| 6,429,846 B2 | 8/2002 | Rosenberg et al. | |
| 6,433,711 B1 | 8/2002 | Chen | |
| 6,697,086 B2 | 2/2004 | Rosenberg et al. | |
| 6,703,924 B2 | 3/2004 | Tecu et al. | |
| 6,850,222 B1 | 2/2005 | Rosenberg | |
| 6,859,819 B1 | 2/2005 | Rosenberg et al. | |
| 7,027,032 B2 | 4/2006 | Rosenberg et al. | |
| 7,109,967 B2 | 9/2006 | Hioki et al. | |
| 7,148,875 B2 | 12/2006 | Rosenberg et al. | |
| 7,161,580 B2 | 1/2007 | Bailey et al. | |
| 7,516,406 B1 | 4/2009 | Cameron | |
| 7,812,828 B2 | 10/2010 | Westerman et al. | |
| 7,815,436 B2 | 10/2010 | Cunningham et al. | |
| 7,843,438 B2 | 11/2010 | Onoda et al. | |
| 7,920,124 B2 | 4/2011 | Tokita et al. | |
| 8,004,498 B1 | 8/2011 | Meridian | |
| 8,122,354 B1 | 2/2012 | Torgerson | |
| 8,210,942 B2 | 7/2012 | Shimabukuro et al. | |
| 8,264,465 B2 | 9/2012 | Grant et al. | |
| 8,294,557 B1 | 10/2012 | El Saddik et al. | |
| 8,494,860 B2 | 7/2013 | Asakawa et al. | |
| 8,677,274 B2 | 3/2014 | Runov et al. | |
| 10,073,526 B2 | 9/2018 | Cruz-Hernandez et al. | |
| 10,073,527 B2 | 9/2018 | Cruz-Hernandez et al. | |
| 2001/0035854 A1 | 11/2001 | Rosenberg et al. | |
| 2002/0177471 A1 | 11/2002 | Kaaresoja et al. | |
| 2003/0063128 A1 | 4/2003 | Salmimaa et al. | |
| 2003/0184518 A1 | 10/2003 | Numata et al. | |
| 2004/0107407 A1 | 6/2004 | Henson et al. | |
| 2004/0169674 A1 | 9/2004 | Linjama et al. | |
| 2004/0218910 A1 | 11/2004 | Chang et al. | |
| 2004/0233162 A1 | 11/2004 | Kobayashi | |
| 2004/0251780 A1 | 12/2004 | Goodson et al. | |
| 2005/0017947 A1 | 1/2005 | Shahoian et al. | |
| 2005/0030292 A1 | 2/2005 | Diederiks | |
| 2005/0052430 A1 | 3/2005 | Shahoian et al. | |
| 2005/0057528 A1 | 3/2005 | Kleen | |
| 2006/0046031 A1 | 3/2006 | Janevski et al. | |
| 2006/0061545 A1 | 3/2006 | Hughes et al. | |
| 2006/0061558 A1 | 3/2006 | Grant et al. | |
| 2006/0101347 A1* | 5/2006 | Runov | G06F 17/30067 715/764 |
| 2006/0106767 A1 | 5/2006 | Adcock et al. | |
| 2006/0119573 A1 | 6/2006 | Grant et al. | |
| 2006/0119586 A1 | 6/2006 | Grant et al. | |
| 2006/0181510 A1 | 8/2006 | Faith | |
| 2006/0209037 A1 | 9/2006 | Wang et al. | |
| 2006/0226298 A1 | 10/2006 | Pierson | |
| 2006/0267416 A1 | 11/2006 | Suzuki | |
| 2006/0290662 A1 | 12/2006 | Houston et al. | |
| 2007/0021961 A1 | 1/2007 | Oh et al. | |
| 2007/0036450 A1 | 2/2007 | Kondo et al. | |
| 2007/0066283 A1 | 3/2007 | Haar et al. | |
| 2007/0152974 A1 | 7/2007 | Kim et al. | |
| 2007/0236450 A1 | 10/2007 | Colgate et al. | |
| 2007/0236474 A1 | 10/2007 | Ramstein | |
| 2007/0279401 A1 | 12/2007 | Ramstein et al. | |
| 2007/0290988 A1 | 12/2007 | Nogami et al. | |
| 2008/0048974 A1 | 2/2008 | Braun et al. | |
| 2008/0062145 A1 | 3/2008 | Shahoian et al. | |
| 2008/0068348 A1 | 3/2008 | Rosenberg et al. | |
| 2008/0068648 A1 | 3/2008 | Benz et al. | |
| 2008/0216578 A1 | 9/2008 | Takashima et al. | |
| 2008/0218488 A1 | 9/2008 | Yang et al. | |
| 2008/0226134 A1 | 9/2008 | Stetten et al. | |
| 2009/0063472 A1* | 3/2009 | Pell | G06F 17/30684 |
| 2009/0079296 A1 | 3/2009 | Takahashi et al. | |
| 2009/0102805 A1 | 4/2009 | Meijer et al. | |
| 2009/0112572 A1 | 4/2009 | Thorn | |
| 2009/0134744 A1 | 5/2009 | Yoon et al. | |
| 2009/0135142 A1* | 5/2009 | Fu | G06F 3/016 345/168 |
| 2009/0167701 A1 | 7/2009 | Ronkainen | |
| 2009/0178008 A1 | 7/2009 | Herz et al. | |
| 2009/0207129 A1 | 8/2009 | Ullrich et al. | |
| 2009/0227296 A1 | 9/2009 | Kim et al. | |
| 2009/0284485 A1 | 11/2009 | Colgate et al. | |
| 2010/0013653 A1 | 1/2010 | Birnbaum et al. | |
| 2010/0020036 A1 | 1/2010 | Hui et al. | |
| 2010/0026976 A1 | 2/2010 | Meehan et al. | |
| 2010/0073304 A1 | 3/2010 | Grant et al. | |
| 2010/0079264 A1 | 4/2010 | Hoellwarth | |
| 2010/0108408 A1 | 5/2010 | Colgate et al. | |
| 2010/0128002 A1 | 5/2010 | Stacy et al. | |
| 2010/0145934 A1* | 6/2010 | Tran | G06F 17/30864 707/722 |
| 2010/0188327 A1 | 7/2010 | Frid et al. | |
| 2010/0223133 A1* | 9/2010 | Scott | G06Q 30/02 705/14.54 |
| 2010/0231539 A1 | 9/2010 | Cruz-Hernandez et al. | |
| 2010/0315212 A1 | 12/2010 | Radivojevic et al. | |
| 2011/0115709 A1 | 5/2011 | Cruz-Hernandez | |
| 2011/0157088 A1 | 6/2011 | Motomura et al. | |
| 2011/0248817 A1 | 10/2011 | Houston et al. | |
| 2011/0287986 A1 | 11/2011 | Mordukhovich et al. | |
| 2012/0154133 A1 | 6/2012 | Kyung et al. | |
| 2012/0182248 A1 | 7/2012 | Kobayashi et al. | |
| 2012/0232780 A1 | 9/2012 | Delson et al. | |
| 2014/0317200 A1 | 10/2014 | Lucero et al. | |
| 2014/0317503 A1 | 10/2014 | Lucero et al. | |

(56) References Cited

U.S. PATENT DOCUMENTS

| | | | |
|---|---|---|---|
| 2015/0253848 | A1 | 9/2015 | Heubel et al. |
| 2018/0052556 | A1 | 2/2018 | Levesque et al. |

FOREIGN PATENT DOCUMENTS

| | | |
|---|---|---|
| EP | 0 899 650 | 3/1999 |
| EP | 1 401 185 | 3/2004 |
| EP | 1 731 993 | 12/2006 |
| EP | 1 748 350 | 1/2007 |
| GB | 2 416 962 | 2/2006 |
| JP | 1185400 A | 3/1999 |
| JP | 11-212725 | 8/1999 |
| JP | 2001-339965 A | 12/2001 |
| JP | 2002-149312 A | 5/2002 |
| JP | 2004-046792 A | 2/2004 |
| JP | 2004-265281 | 9/2004 |
| JP | 2005-071157 | 3/2005 |
| JP | 2005/077674 | 3/2005 |
| JP | 2005-258666 | 9/2005 |
| JP | 2006-163206 | 6/2006 |
| JP | 2006/228151 | 8/2006 |
| JP | 2008-516348 | 5/2008 |
| JP | 2008-146560 A | 6/2008 |
| JP | 2008-520012 | 6/2008 |
| JP | 2009/003867 | 1/2009 |
| WO | 2001/054109 | 7/2001 |
| WO | 2002/073587 | 9/2002 |
| WO | 2004/044728 | 5/2004 |
| WO | 2004/051451 | 6/2004 |
| WO | 2004/075169 | 9/2004 |
| WO | 2005/103863 | 11/2005 |
| WO | 2006/042309 | 4/2006 |
| WO | 2007/117418 | 10/2007 |
| WO | 2007/120562 | 10/2007 |
| WO | 2008/037275 | 4/2008 |
| WO | 2008/042745 | 4/2008 |
| WO | 2008/103535 | 8/2008 |
| WO | 2008/132540 | 11/2008 |
| WO | 2008/144108 | 11/2008 |
| WO | 2009/002605 | 12/2008 |
| WO | 2009/026337 | 2/2009 |
| WO | 2009/074185 | 6/2009 |

OTHER PUBLICATIONS

Corel Paint Shop Pro Photo X2 Reviewer's Guide, Copyright 2007, web page at http://web.archive.org/web/20071102133023/http://www.corel.com/content!vpk!psppx2/PS_P_PX2Reviewer_Guide.pdf, as available via the internet and accessed Apr. 7, 2012.
"Cyberman Technical Specification", Logitech Cyberman SWIFT Supplement, Revision 1.0, Apr. 5, 1994, 28 pages.
"Micro Touch Capacitive TouchSense System", 3M Touch System, Methuen, MA, Published 2008.
"Mouse Ball-Actuating Device With Force and Tactile Feedback", IBM Technical Disclosure Bulletin, vol. 32, No. 98, Feb. 1990.
"Safe Flight Instrument Corporation", Coaxial Control Shaker, part No. C-25502, Jul. 1, 1967.
U.S. Appl. No. 12/696,893, "Ex-Parte Quayle Action", Mar. 17, 2017, 5 pages.
U.S. Appl. No. 12/696,893, "Final Office Action", dated Mar. 11, 2014, 16 pages.
U.S. Appl. No. 12/696,893, "Final Office Action", dated Jun. 6, 2013, 28 pages.
U.S. Appl. No. 12/696,893, "Non-Final Office Action", dated Oct. 22, 2013, 16 pages.
U.S. Appl. No. 12/696,893, "Non-Final Office Action", dated Feb. 29, 2012, 20 pages.
U.S. Appl. No. 12/696,893, "Non-Final Office Action", dated Sep. 6, 2012, 27 pages.
U.S. Appl. No. 12/696,900, "Final Office Action", dated Aug. 19, 2016, 11 pages.
U.S. Appl. No. 12/696,900, "Non Final Office Action", dated Dec. 12, 2016, 11 pages.
U.S. Appl. No. 12/696,900, "Non-Final Office Action", dated May 9, 2016, 12 pages.
U.S. Appl. No. 12/696,900, "Office Action", dated Jan. 15, 2013, 62 pages.
U.S. Appl. No. 12/697,010, "Non-Final Office Action", dated May 20, 2016, 12 pages.
U.S. Appl. No. 12/697,010, "Non-Final Office Action", dated Feb. 22, 2017, 22 pages.
U.S. Appl. No. 12/697,037, "Final Office Action", dated Jan. 17, 2017, 16 pages.
U.S. Appl. No. 12/697,037, "Non-Final Office Action", dated Jun. 6, 2016, 14 pages.
U.S. Appl. No. 12/697,042, "Final Office Action", dated Nov. 30, 2016, 20 pages.
U.S. Appl. No. 12/697,042, "Non-Final Office Action", dated May 17, 2016, 43 pages.
U.S. Appl. No. 12/947,321, "Final Office Action", dated Oct. 3, 2017, 35 pages.
U.S. Appl. No. 12/947,321, "Non-Final Office Action", dated Nov. 2, 2012, 22 pages.
U.S. Appl. No. 12/947,321, "Non-Final Office Action", dated Jun. 16, 2017, 34 pages.
U.S. Appl. No. 12/947,532, "Final Office Action", dated Feb. 2, 2017, 31 pages.
U.S. Appl. No. 12/947,532, "Final Office Action", dated Sep. 8, 2017, 33 pages.
U.S. Appl. No. 12/947,532, "Non Final Office Action", dated May 23, 2017, 29 pages.
U.S. Appl. No. 12/947,532, "Non-Final Office Action", dated Sep. 9, 2016, 26 pages.
U.S. Appl. No. 12/947,532, "Office Action", dated Nov. 15, 2012, 20 pages.
U.S. Appl. No. 15/649,208, "Non-Final Office Action", dated Dec. 21, 2017, 5 pages.
Adelstein , "A Virtual Environment System for the Study of Human Arm Tremor", Ph.D. Dissertation, Department of Mechanical Engineering, MIT, Jun. 1989.
Adelstein , "Design and Implementation of a Force Reflecting Manipulandum for Manual Control Research", Advances in Robotics, DSC vol. 42, Edited by H. Kazerooni, 1992, pp. 1-12.
Aukstakalnis et al., "Silicon Mirage: The Art and Science of Virtual Reality", Peachpit Press, Inc., Berkeley, CA, 1992, pp. 129-180.
Baigrie , "Electric Control Loading—A Low Cost. High Performance Alternative", Proceedings, Nov. 6-8, 1990, pp. 247-254.
Bejczy et al., "A Laboratory Breadboard System for Dual-Aim Teleoperation", SOAR '89 Workshop, JSC, Houston, Jul. 25-27, 1989.
Bejczy , "Generalization of Bilateral Force-Reflecting Control of Manipulators", Proceedings of Fourth CISM-IFToMM, Sep. 8-12, 1981.
Bejczy et al., "Kinesthetic Coupling Between Operator and Remote Manipulator", International Computer Technology Conference, The American Society of Mechanical Engineers, San Francisco, CA., Aug. 12-15, 1980, pp. 1-9.
Bejczy , "Sensors, Controls, and Man-Machine Interface for Advanced Teleoperation", Science vol. 208, No. 4450, Jun. 1980, pp. 1327-1335.
Bejczy et al., "Universal Computer Control System (UCCS) for Space Telerobots", Robotics and Automation. Proceedings. 1987 IEEE International Conference, Mar. 1987, pp. 318-324.
Biet , "Discrimination of Virtual Square Gratings by Dynamic Touch on Friction Based Tactile Displays, Haptic Interfaces for Virtual Environment and Teleoperator Systems", Symposium, IEEE, Piscataway, NJ, Mar. 2008, pp. 41-48.
Brooks et al., "Hand Controllers for Teleoperation—A State-of-the-Art Technology Survey and Evaluation", JPL Publication 85-11; NASA-CR-175890; N85-28559, Mar. 1, 1985, pp. 1-84.
Burdea et al., "Distributed Virtual Force Feedback, Lecture Notes for Workshop on Force Display in Virtual Environments and its Application to Robotic Teleoperation", 1993 IEEE International Conference on Robotics and Automation, 1993, pp. 25-44.

(56) References Cited

OTHER PUBLICATIONS

Buttolo et al., "Pen-based force Display for Precision Manipulation in Virtual Environments", IEEE, 0-8186-7084-3, 1995, pp. 217-224.
Caldwell et al., "Enhanced Tactile Feedback (Tele-Taction) Using a Multi-Functional Sensory System", IEEE International Conference on Robotics and Automation, vol. 1, May 1993, pp. 955-960.
Chakrabarti et al., "Rendering Color Information using Haptic Feedback", University of British Columbia CS Technical Report, Retrieved from https//www.cs.ubc.ca/cgi-bin/tr/2004/TR-2004-10.pdf, Jul. 22, 2004, 9 pages.
Chowdhury et al., "The Effect of Amplitude of Vibration on the Coefficient of Friction for Different Materials", Tribology International. vol. 41, Issue 4, Apr. 2008, pp. 307-317.
CN 201080011708.7, "Office Action", dated Jan. 26, 2015, 12 pages.
CN 201080011708.7, "Office Action", dated Jul. 10, 2014, 12 pages.
CN 201080011743, "Office Action", dated Nov. 3, 2014.
CN 201080011744.3, "Office Action", dated Jun. 24, 2014, 13 pages.
CN 201080011744.3, "Office Action", dated Aug. 12, 2015, 6 pages.
CN 201080011744.3, "Office Action", dated Dec. 16, 2014, 7 pages.
CN 201080011744.3, "Office Action", dated Sep. 23, 2013, 8 pages.
CN 201510772201.8, "Office Action", dated Nov. 23, 2017, 9 pages.
Dewitt, "Designing Sanification of User Data in Affective Interaction", Master of Science Thesis Stockholm, hppt://w3.nada.kth.se/utbildning/grukth/exjobb/rapportlistor/2007/rapporter07/de__wit_anna_07142, Oct. 20, 2009.
Eberhardt et al., "Inducing Dynamic Haptic Perception by the Hand: System Description and Some Results", Dynamic Systems and Control, 1994, vol. 1, presented at 1994 International Mechanical Engineering Congress and Exposition, Chicago Illinois, Nov. 6-11, 1994, 8 pages.
Eberhardt et al., "OMAR—A Haptic display for speech perception by deaf and deaf-blind individuals", IEEE Virtual Reality Annual International Symposium, Seattle, WA, Sep. 18-22, 1993.
EP 10712200.4, "Office Action", dated Mar. 1, 2017.
EP 10787610.4, "Office Action", dated Aug. 21, 2017, 7 pages.
EP17181965.9, "Extended European Search Report", dated Nov. 14, 2017, 13 pages.
Gobel et al., "Tactile Feedback Applied to Computer Mice", International Journal of Human-Computer Interaction, vol. 7, No. 1, 1995, pp. 1-24.
Gotow et al., "Controlled Impedance Test Apparatus for Studying Human Interpretation of Kinesthetic Feedback", WA11-11:00, pp. 332-337.
Howe, "A Force-Reflecting Teleoperated Hand System for the Study of Tactile Sensing in Precision Manipulation", Proceedings of the 1992 IEEE International Conference on Robotics and Automation, Nice, France, May 1992, pp. 1321-1326.
Jacobsen et al., "High Performance, Dextrous Telerobotic Manipulator With Force Reflection", Intervention/ROV '91 Conference & Exposition, May 21-23, 1991.
Jones et al., "A perceptual analysis of stiffness", ISSN 0014-4819 Springer International (Springer-Verlag); Experimental Brain Research, vol. 79, No. 1, Jan. 1990, pp. 150-156.
JP 2011-554172, "Office Action", dated Jan. 28, 2014, 3 pages.
JP 2011-554174, "Office Action", dated Jan. 28, 2014, 3 pages.
JP 2011-554175, "Office Action", dated Mar. 1, 2016, 6 pages.
JP 2011-554180, "Office Action", dated Jan. 7, 2014, 2 pages.
JP 2011-554180, "Office Action", dated Dec. 16, 2014, 2 pages.
JP 2014-171836, "Office Action", dated Nov. 4, 2015, 3 pages.
JP 2015-019308, "Office Action", dated Feb. 26, 2016.
JP 2015-019308, "Office Action", dated Mar. 1, 2016, 4 pages.
JP 2015-020413, "Office Action", dated Apr. 1, 2016.
JP 2015-083829, "Office Action", dated Feb. 16, 2016, 5 pages.
JP 2016-130597, "Office Action", dated Mar. 28, 2017, 6 pages.
Kaaresoja et al., "Snap-crackle-pop: Tactile feedback for mobile touch screens", proceedings of the Eurohaptics http://lsc.unv-evry.fr/eurohaptics/upload/cd/papers/f80, Jul. 31, 2006, 2 pages.
Kaczmarek et al., "Tactile Displays", Virtual Environment Technologies, 1995, pp. 349-414.
Kontarinis et al., "Display of High-Frequency Tactile Information to Teleoperators", Telemanipulator Technology and Space Telerobotics, Proc. SPIE, vol. 2057, Sep. 7-9, 1993, pp. 40-50.
KR 10-2011-7023926, "Office Action", dated Sep. 30, 2015, 6 pages.
KR 10-2011-7023927, "Office Action", dated Sep. 30, 2015.
KR10-2011-7023987, "Office Action", dated Aug. 21, 2015, 5 pages.
KR 10-2016-7029343, "Office Action", dated Jan. 18, 2017, 6 pages.
KR 10-2016-7029343, "Office Action", dated Jul. 13, 2017, 7 pages.
KR 10-2017-7032128, "Office Action", dated Feb. 5, 2018, 10 pages.
Kumazawa et al., "Seeking user interface casually used immediately after touched, ILE Technical Report", The Institute of Image Information and Television Engineers, vol. 29, No. 46, Aug. 29, 2005, pp. 67-70.
Levin et al., "Tactile-Feedback Solutions for an Enhanced User Experience", Information Display, Oct. 2009, pp. 18-21.
Maeno et al., "Tactile Display of Surface Texture by use of Amplitude Modulation of Ultrasonic Vibration", IEEE Ultrasonics Symposium, 2006, pp. 62-65.
Marcus, "Touch Feedback in Surgery", Proceedings of Virtual Reality and Medicine the Cutting Edge, Sep. 8-11, 1994.
McAffee, "Teleoperator Subsystem/Telerobot Demonstrator: Force Reflecting Hand Controller Equipment Manual", JPL D-5172, Jan. 1988, pp. 1-50, A1-A36, B1-B5, C1-C36.
Meyer et al., "Fingertip Friction Modulation due to Electrostatic Attraction", IEEE World Haptics Conference, 2013, pp. 43-48.
Minsky, "Computational Haptics: The Sandpaper System for Synthesizing Texture for a Force-Feedback Display", Ph.D. Dissertation, MIT, Jun. 1995, 217 pages.
Oakley et al., "Contact IM: Exploring Asynchronous Touch Over Distance", Proceedings of CSCW, Jan. 1, 2002, 2 pages.
Ouhyoung "A Low-Cost Force Feedback Joystick and Its Use in PC Video Games", IEEE Transactions on, Consumer Electronics, vol. 41, No. 3, Aug. 1995, pp. 787-794.
Ouhyoung, "Force Display in Molecular Docking", Order No. 9034744, Feb. 1990, pp. 1-369.
Ouhyoung et al., "The Development of a Low-Cost Force Feedback Joystick and Its Use in the Virtual Environment", Pacific Graphics 1995 Conference Proceedings, Aug. 1995, pp. 309-319.
Patrick et al., "Design and Testing of a Nonreactive, Fingertip, Tactile Display for Interaction With Remote Environments", Proceedings, vol. 1387, Cooperative Intelligent Robotics in Space, 1991, pp. 215-222.
PCT/US2010/026894, "International Preliminary Report on Patentability", dated Sep. 22, 2011, 8 pages.
PCT/US2010/026894, "International Search Report and Written Opinion", dated Jun. 8, 2010, 10 pages.
PCT/US2010/026897, "International Preliminary Report on Patentability", dated Sep. 22, 2011, 8 pages.
PCT/US2010/026897, "International Search Report and Written Opinion", dated Jun. 8, 2010, 10 pages.
PCT/US2010/026900, "International Preliminary Report on Patentability", dated Sep. 22, 2011, 8 pages.
PCT/US2010/026900, "International Search Report and Written Opinion", dated Jun. 8, 2010, 10 pages.
PCT/US2010/026905, "International Preliminary Report on Patentability", dated Sep. 22, 2011, 9 pages.
PCT/US2010/026905, "International Search Report and Written Opinion", dated Jun. 8, 2010, 11 pages.
PCT/US2010/026907, "International Preliminary Report on Patentability", dated Sep. 22, 2011, 8 pages.
PCT/US2010/026907, "International Search Report and Written Opinion", dated Jun. 8, 2010, 11 pages.
PCT/US2010/026909, "International Preliminary Report on Patentability", dated Sep. 22, 2011, 9 pages.
PCT/US2010/026909, "International Search Report and Written Opinion", dated Jun. 8, 2010.

(56) References Cited

OTHER PUBLICATIONS

Pimentel et al., "Virtual Reality: Through the New Looking Glass", $2^{nd}$ Edition; McGraw-Hill, 1994, pp. 41-202.

Rabinowitz et al., "Multidimensional Tactile Displays: Identification of Vibratory Intensity, Frequency, and Contactor Area", Journal of The Acoustical Society of America, vol. 82, No. 4, Oct. 1987, pp. 1243-1252.

Rovers et al., "HIM: A Framework for Haptic Instant Messaging", CHI 2004 (CHI Conference Proceedings, Human Factors in Computing Systems), Apr. 2004, pp. 1313-1316.

Russo, "Controlling Dissipative Magnetic Particle Brakes in Force Reflective Devices", Proc. ASME Winter Ann. Meeting, Anaheim, CA, 1992, 1992, pp. 63-70.

Russo, "The Design and Implementation of a Three Degree of Freedom Force Output Joystick", Massachusetts Institute of Technology. Dept. of Mechanical Engineering, May 1990, pp. 1-131.

Scannell, "Taking a Joystick Ride", Computer Currents, Boston Edition, vol. 9, No. 11, Nov. 1994.

Sekiguchi et al., "Haptic Interface using Estimation of Box Contents Metaphor", Proceedings of ICAT 2003, http://www.vrsj.org/ic-at/papers/2003/00947_00000, as available via the Internet Oct. 20, 2009.

Shimoga, "Finger Force and Touch Feedback Issues in Dexterous Telemanipulation", Proceedings of Fourth Annual Conference on Intelligent Robotic Systems for Space Exploration, Rensselaer Polytechnic Institute, Sep. 30-Oct. 1, 1992, pp. 159-178.

Snow et al., "Model-X Force-Reflecting-Hand-Controller", NT Control No. MPO-17851; JPL Case No. 5348, Jun. 1989, pp. 1-4.

Stanley, "Computer Simulation of Interacting Dynamic Mechanical Systems Using Distributed Memory Parallel Processors", Advances in Robotics, ASME 1992, 1992, pp. 55-61.

Tadros, "Control System Design for a Three Degree of Freedom Virtual Environment Simulator Using Motor/Brake Pair Actuators", MIT Archive, Massachusetts Institute of Technology, Feb. 1990, pp. 1-88.

Tang et al., "A Microfabricated Electrostatic Haptic Display for Persons with Visual Impairments", IEEE Transactions on Rehabilitation Engineering, vol. 6, issue 3, Sep. 1998, pp. 241-314.

Terry et al., "Tactile Feedback in a Computer Mouse", Proceedings of Fourteenth Annual Northeast Bioengineering Conference, University of New Hampshire, Mar. 10-11, 1988, pp. 146-149.

Watanabe et al., "A Method for Controlling Tactile Sensation of Surface Roughness Using Ultrasonic Vibration", IEEE International Conference on Robotics and Automation, 1995, pp. 1134-1139.

Williamson et al., "Shoogle: Excitatory Multimoda Interaction on Mobile Shoogle: Excitatory Multimoda Interaction on Mobile", Proceedings of the SIGCHI Conference on Human Factors in Computing Systems, ACM, May 3, 2007, pp. 121-124.

U.S. Appl. No. 15/894,966, "Final Office Action", dated Sep. 7, 2018, 8 pages.

JP 2017-176473, "Office Action", dated Aug. 7, 2018, 11 pages.

CN 201510772201.8, "Office Action", dated Aug. 29, 2018, 14 pages.

CN 201510772201.8, "Office Action", dated May 15, 2018, 16 pages.

EP 18185362.3, "Extended European Search Report", dated Nov. 22, 2018, 15 pages.

KR 10-2011-7023927, "Office Action", dated Oct. 16, 2018, 16 pages.

\* cited by examiner

SYSTEMS AND METHODS FOR INTERFACES FEATURING SURFACE-BASED HAPTIC EFFECTS

CROSS-REFERENCE TO RELATED APPLICATIONS

This patent application is a continuation of and claims the benefit of application Ser. No. 12/696,908, filed on Jan. 29, 2010, and entitled "Systems and Methods for Interfaces Features Surface-Based Haptic Effects," which claims the benefit of U.S. Provisional Patent Application No. 61/159,482, entitled "Locating Features Using a Friction Display," filed Mar. 12, 2009, and claims the benefit of U.S. Provisional Patent Application No. 61/262,041, entitled "System and Method for Increasing Haptic Bandwidth in an Electronic Device" filed Nov. 17, 2009, and claims the benefit of U.S. Provisional Patent Application No. 61/262,038, entitled "Friction Rotary Device for Haptic Feedback" filed Nov. 17, 2009, the entirety of all of which is hereby incorporated by reference herein in their entirety.

Application Ser. No. 12/696,908 is related to U.S. patent application Ser. No. 12/697,010, filed the same day and entitled "Systems and Methods for a Texture Engine," which is incorporated by reference herein in its entirety.

Application Ser. No. 12/696,908 is related to U.S. patent application Ser. No. 12/697,042, filed the same day and entitled "Systems and Methods for Using Multiple Actuators to Realize Textures," which is incorporated by reference herein in its entirety.

Application Ser. No. 12/696,908 is related to U.S. patent application Ser. No. 12/697,037, filed the same day and entitled "Systems and Methods for Using Textures in Graphical User Interface Widgets," which is incorporated by reference herein in its entirety.

Application Ser. No. 12/696,908 is related to U.S. patent application Ser. No. 12/696,893, filed the same day and entitled "Systems and Methods for Providing Features in a Friction Display," which is incorporated by reference herein in its entirety.

Application Ser. No. 12/696,908 is related to U.S. patent application Ser. No. 12/696,900, filed the same day and entitled "Systems and Methods for Friction Displays and Additional Haptic Effects," which is incorporated by reference herein in its entirety.

BACKGROUND

Touch-enabled devices have been increasingly popular. For instance, mobile and other devices may be configured with touch-sensitive displays so that a user can provide input by touching portions of the touch-sensitive display. As another example, a touch-enabled surface separate from a display may be used for input, such as a trackpad, mouse, or other device.

For example, a user may touch a portion of the display or surface that is mapped to an on-screen graphical user interface (GUI), such as a button or control. As another example, a gesture may be provided, such as a sequence of one or more touches, drags across the surface, or other recognizable patterns sensed by the device. Although touch-enabled displays and other touch-based interfaces have greatly enhanced device functionality, drawbacks remain. For instance, even if a keyboard is displayed on a screen, a user accustomed to a physical keyboard may not have the same experience while using the touch-enabled device.

SUMMARY

Embodiments of the present invention can provide a touch-enabled device featuring surface-based haptic effects including, but not limited to, changes in texture, changes in a coefficient of friction of the touch surface, and/or simulation of boundaries or obstacles on the touch surface. Through the use of such features, devices may be more user friendly and may provide an overall more compelling user experience.

In one embodiment, a system comprises a sensor configured to detect a touch in a touch area when an object contacts a touch surface, the touch area mapped to a display area of a graphical user interface. The touch surface may correspond to the display area or may correspond to a non-display surface of a computing device or peripheral interfaced to a computing device.

The system can further include an actuator in communication with the processor and coupled to the touch surface, the actuator configured to output a haptic effect. The system can include one or more processors in communication with actuator and sensor, the processor configured to select a haptic effect to generate based on identifying a position of the touch and at least one of (a) recognizing an input gesture provided by the touch or (b) content displayed in the graphical user interface at a location in the display area mapped to a position in the touch area at or near the touch. The processor can command the actuator to generate the selected haptic effect while the touch is occurring to thereby provide a texture, simulate an obstacle or boundary, and/or provide an adjusted coefficient of friction of the display. These effects may be achieved using one or more actuators to provide haptic effects (including, but not limited to, vibrotactile effects) and/or using actuators that change the coefficient of friction of the display in a controlled manner.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device Using a Variable Friction Interface

One illustrative embodiment of the present invention comprises a computing system such as an iPod® portable music device or iPhone® mobile device, both available from Apple Inc. of Cupertino, Calif., or a Zune® portable device, available from Microsoft Corporation of Redmond, Wash. The computing system can include and/or may be in communication with one or more sensors, such as an accelerometer, as well as sensors (e.g., optical, resistive, or capacitive) for determining a location of a touch relative to a display area corresponding in this example to the screen of the device.

As the user interacts with the device, one or more actuators are used to provide tactile effects. For example, as a user moves a finger across the device, the coefficient of friction of the screen can be varied based on the position, velocity, and/or acceleration of the finger. Depending on how the friction is varied, the user may perceive a feature and/or a texture. As a particular example, the friction may be varied so that the user perceives a bump, border, or other obstacle corresponding to an edge of an on-screen button. As will be discussed in further detail below, varying the coefficient of friction can be used in any number of ways to provide feedback to a user.

Illustrative Systems for Providing Surface-Based Haptic Effects

Figure 1A:
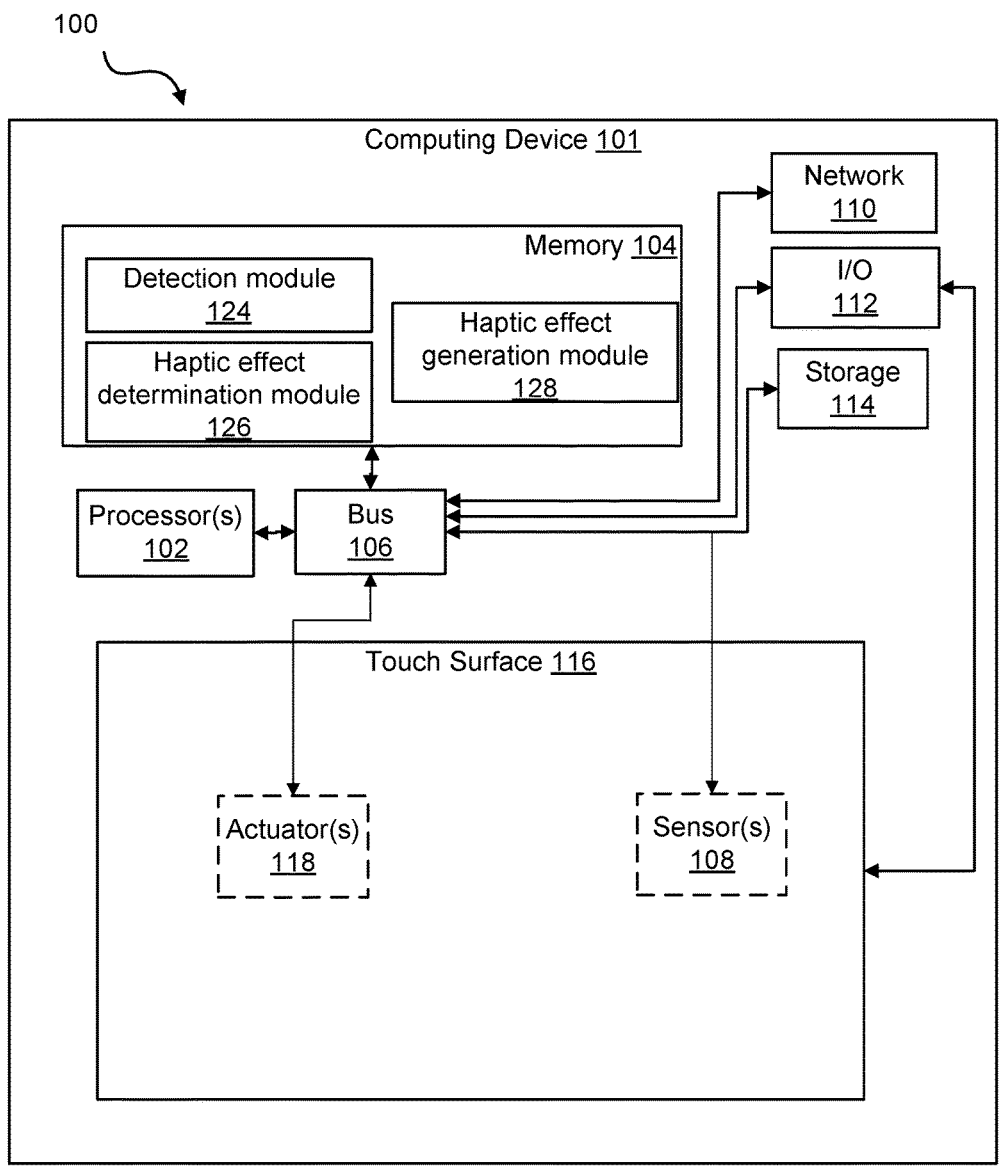
FIG. 1A shows an illustrative system for providing surface-based haptic effects.

FIG. 1A shows an illustrative system 100 for providing a surface-based haptic effect. Particularly, in this example, system 100 comprises a computing device 101 featuring a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device(s) 110 can represent any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as a one or more displays, keyboards, mice, speakers, microphones, and/or other hardware used to input data or output data. Storage 114 represents nonvolatile storage such as magnetic, optical, or other storage media included in device 101.

System 100 further includes a touch surface 116, which is in this example integrated into device 101. Touch surface 116 represents any surface that is configured to sense tactile input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors may be used to determine the touch position.

In this example, an actuator 118 in communication with processor 102 is coupled to touch surface 116. In some embodiments, actuator 118 is configured to output a haptic effect varying a coefficient of friction of the touch surface in response to a haptic signal. Additionally or alternatively, actuator 118 may provide haptic effects that move the touch surface in a controlled manner. Some haptic effects may utilize an actuator coupled to a housing of the device, and some haptic effects may use multiple actuators in sequence and/or in concert. For example, the coefficient of friction can be varied by vibrating the surface at different frequencies. Different combinations/sequences of variance can be used to simulate the feeling of a texture.

Although a single actuator 118 is shown here, embodiments may use multiple actuators of the same or different type to vary the coefficient of friction of the touch surface. For example, a piezoelectric actuator is used in some embodiments to displace some or all of touch surface 116 vertically and/or horizontally at ultrasonic frequencies. In some embodiments, multiple actuators such as eccentric rotating mass motors and linear resonant actuators can be used alone or in concert to provide different textures, friction variances, and other haptic effects. Other examples of actuators include electroactive polymers, shape memory alloys, electrostatic, and magnetostrictive actuators.

Turning to memory 104, exemplary program components 124, 126, and 128 are depicted to illustrate how a device can be configured in some embodiments to provide a variable-friction display. In this example, a detection module 124 configures processor 102 to monitor touch surface 116 via sensor(s) 108 to determine a position of a touch. For example, module 124 may sample sensor 108 in order to track the presence or absence of a touch and, if a touch is present, to track the location, path, velocity, acceleration, pressure and/or other characteristics of the touch over time.

Haptic effect determination module 126 represents a program component that analyzes data regarding touch characteristics to select a haptic effect to generate. For example, in some embodiments, an input gesture comprising a sequence of one or more touches may be recognized and correlated to one or more haptic effects. As another example, some or all of the area of touch surface 116 may be mapped to a graphical user interface. Different haptic effects may be selected based on the location of a touch in order to simulate the presence of a feature by varying the friction of touch surface 116 so that the feature is "felt" when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to actuator(s) 118 to generate the selected haptic effect at least when a touch is occurring. For example, generation module 128 may access stored waveforms or commands to send to actuator 118. As another example, haptic effect generation module 128 may receive a desired coefficient of friction and utilize signal processing algorithms to generate an appropriate signal to send to actuator(s) 118. As a further example, a desired texture may be indicated along with target coordinates for the texture and an appropriate waveform sent to one or more vibrotactile actuators to generate appropriate displacement of the surface (and/or other device components) to provide the texture.

Figure 1B:
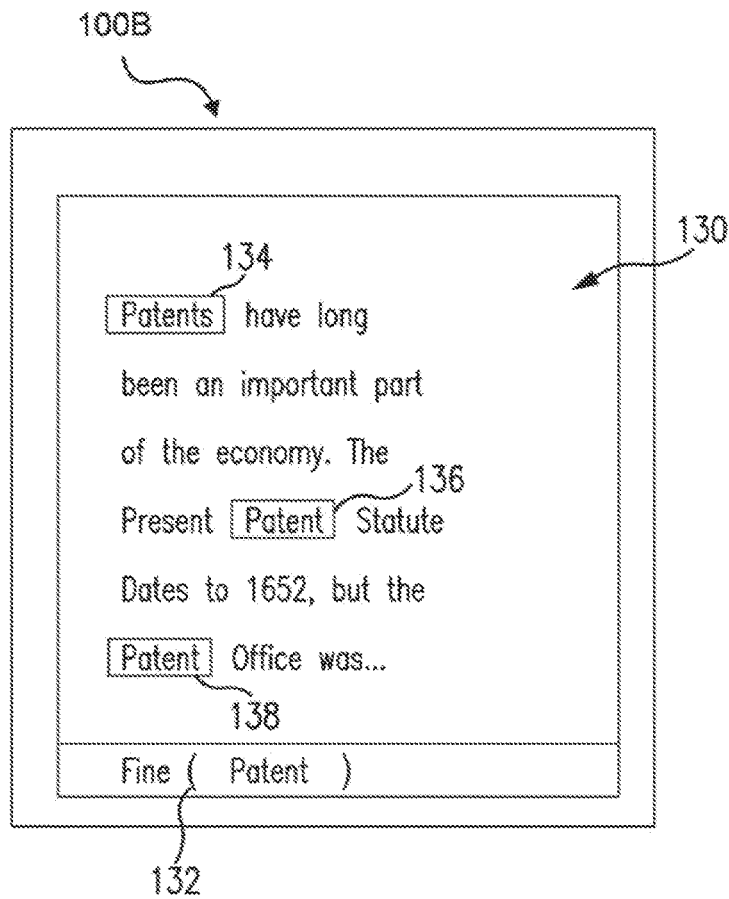
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch-enabled display 116 that combines a touch surface and a display of the device. The touch surface may correspond to the display exterior or one or more layers of material above the actual display components.

In this example, a haptic effect is selected based on the content of text displayed in a graphical user interface 130. Particularly, as indicated by interface element 132, a "find" command has been used to trigger a search query. A haptic effect can be selected to generate a haptic effect at positions in the touch area mapped to positions in the user interface corresponding to the searched content. In this example, the touch surface is mapped directly to the display area, and so when the searched content (the word "patent") is located, it is highlighted in interface 130 as shown at 134, 136, and 138.

In accordance with aspects of the present subject matter, the processor(s) of device 101 can select an appropriate haptic effect so that when a user touches screen 116 at or near 134, 136, and/or 138, the coefficient of friction of the screen is varied. For instance, this may allow a user to "skim" the text using his or her fingers, with the text of interest tactilely highlighted by having a higher (or lower) coefficient of friction or a texture distinct from other displayed content. More complex effects may also be created; for instance, a border or texture around the highlighted words can be generated using one or more actuators of device 101.

Figure 1C:
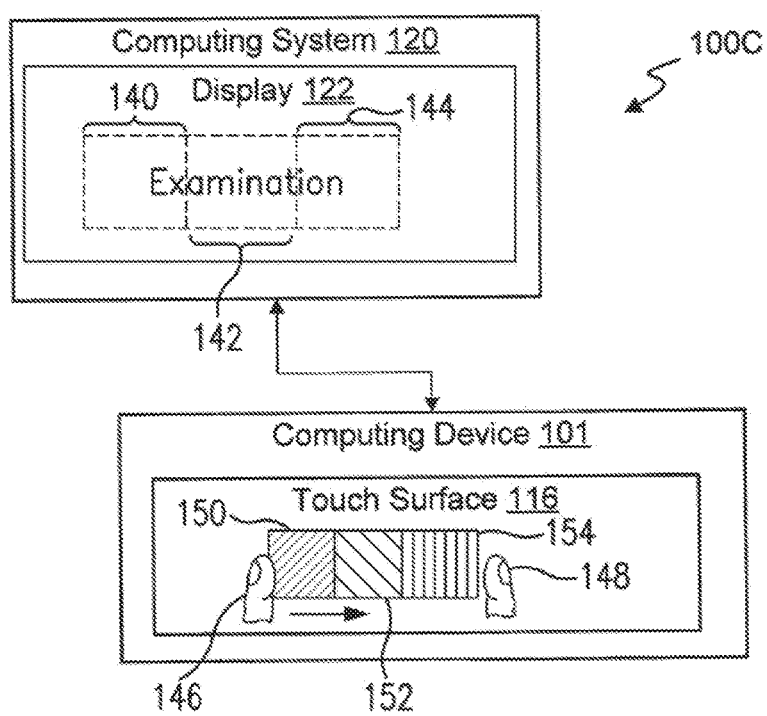
FIG. 1C illustrates another embodiment of the system shown in FIG. 1A.

As was noted above, a touch surface need not overlay a display. FIG. 1C illustrates another example of a touch-enabled computing system 100C. In this example, a computing device 101 features a touch surface 116 which is mapped to a graphical user interface provided in a display 122 that is included in computing system 120 interfaced to device 101. For example, computing device 101 may comprise a mouse, trackpad, or other device, while system 120 may comprise a desktop or laptop computer, set-top box (e.g., DVD player, DVR, cable television box), or another computing system. As another example, touch surface 116 and display 122 may be included in the same device, such as a touch-enabled trackpad in a laptop computer featuring display 122.

Whether integrated with a display or otherwise, the depiction of 2-D rectangular touch surfaces in the examples herein is not meant to be limiting. Other embodiments include curved or irregular touch-enabled surfaces that are further configured to provide surface-based haptic effects.

Returning to FIG. 1C, in this example the user interface features textual content (the word "Examination") in the process of being selected in response to a user gesture input via touch surface 116. Particularly, first portion 140 is highlighted based on movement of finger 146 through area 150 of touch surface 116. As the word is selected, finger 146 will move to the position shown at 148, while in the graphical user interface, portions 142 and 144 of the word are highlighted.

A haptic effect can be provided in response to the gesture and/or based on the content of the word. For instance, as indicated by the different cross-hatching of areas 150, 152, and 154, the coefficient of friction of surface 116 can be changed as the word is highlighted. In some embodiments, content of selected text or other items is used to determine the haptic effect.

For instance, the friction may vary based on a "height map" of the selected text, with short letters ("e", "r") having a low height and taller letters (such as "l", "f") having a higher height. A frequency transform can be used to find the frequency content of the word; alternatively, a distance between the letter could be used to determine a "feel" for the word. As another example, the friction may be adjusted based simply on the selection, such as an increase in friction as the end of a word, phrase, or other unit is reached; this may help the user avoid selecting undesired portions of adjacent content. Boundaries between words can, of course, be recognized by identifying spaces, while grammar analysis (e.g., analyzing context, usage) as is known in the art can be used to recognize phrases.

In this example, textual selection was described based on left-to-right highlighting. Surface-based textual effects may be associated with other types of selection actions. For example, a user may draw a box by touching at an origin point and then dragging outward with a second object, with the two points representing opposite corners of a bounding box. A haptic effect such as a varying friction or texture can be provided while the selection is in progress and/or after selection is completed. Additionally or alternatively, while the area is selected, the portion of the touch area corresponding to the selected area may have a distinct texture or coefficient of friction. As another example, the selected area may be indicated haptically by a border or perimeter (e.g., a haptic click, pop, or friction variance to identify when a touch crosses into or out of the selected area).

Illustrative Methods for Determining Haptic Effects to Provide

Figure 2:
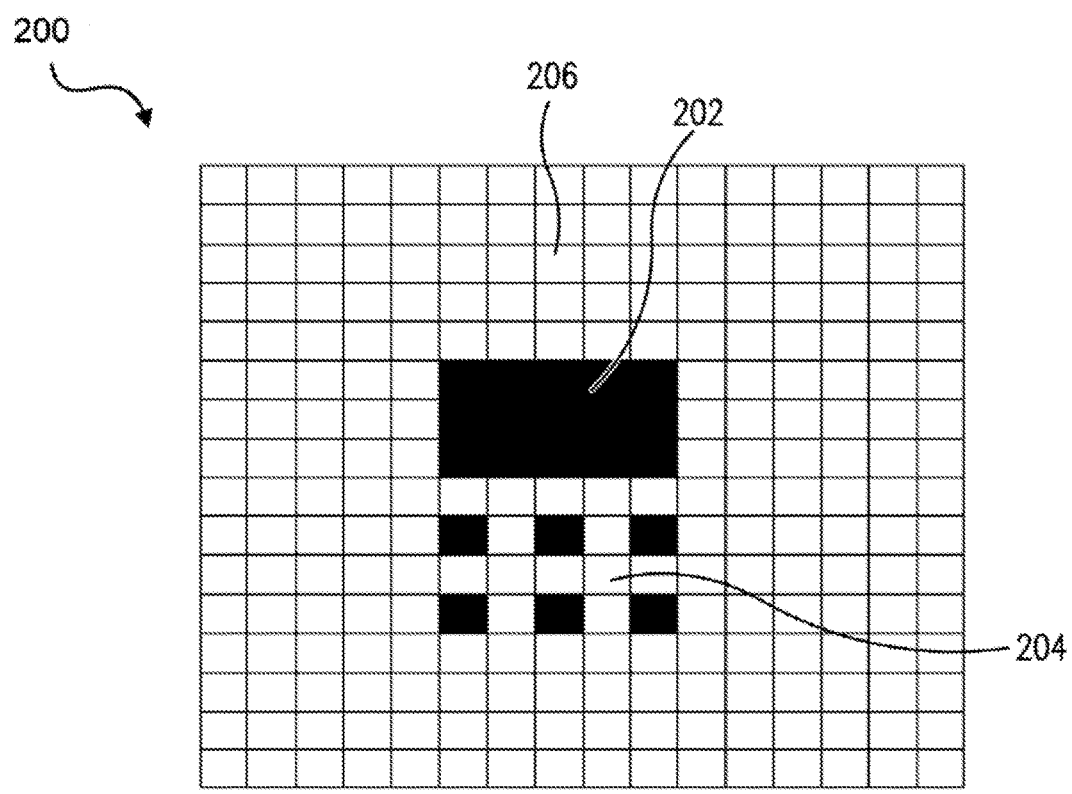
FIG. 2 is a diagram illustrating an array of pixels 200 which can be used in some embodiments to select a haptic effect.

FIG. 2 is a diagram illustrating an array of pixels 200 which can be used in some embodiments to select a haptic effect to provide based on mapping a detected touch to one or more pixel locations. Array 200 may, for instance, comprise a bitmap or other image file having one or more values associated with each pixel, with the value(s) used to determine how haptic effects are to be provided. This example shows a relatively small number of pixels; in practice, the array may comprise thousands or millions of pixels.

In some embodiments, a position of a touch within a touch area defined by the touch surface can be returned and then converted to one or more pixel addresses. The value or values associated with the pixel address(es) can be accessed and used to drive the actuator(s) of the haptic device (including the variable friction device or devices). For instance, each pixel address may be associated with an intensity value that is correlated to an amplitude with which a piezoelectric actuator is to be driven. As a more complex example, each pixel address may be associated with three intensity values (i.e., RGB). Each of the three intensity values can be associated with a different actuator intensity in some embodiments. As another example, some values may specify intensity and others specify duration of operation. As a further example, different pixel intensity values may be correlated to different desired textures or components used to drive actuators to simulate a single texture. Still further, a multilayer RGB image file may be used, with each layer corresponding to a particular actuator.

In this example, a first plurality of pixels 202 are associated with intensity values and form a "block," while a second plurality of pixels 204 form a different pattern. The different patterns may result in different effects based on how an object encounters the patterns. For instance, an object moving from top to bottom may encounter a first change in friction caused by pattern 202 and then a different variance caused by pattern 204; the same patterns encountered in reverse order (i.e., bottom to top) may simulate a different feel entirely.

The mapping between the touch surface and graphical user interface may be absolute or may be scaled. For example, in some embodiments, a touch location is directly correlated to a corresponding pixel address (or pixel addresses), with the associated values used in selecting haptic effects to drive the actuator(s). In other embodiments, the touch location and velocity is considered. For example, the actual touch address may be above pattern 202 but may be associated with a vector indicating motion towards pattern 202, and thus the values of pixels in pattern 202 are used to drive the actuators in time for the haptic effect to be played appropriately.

Figure 3:
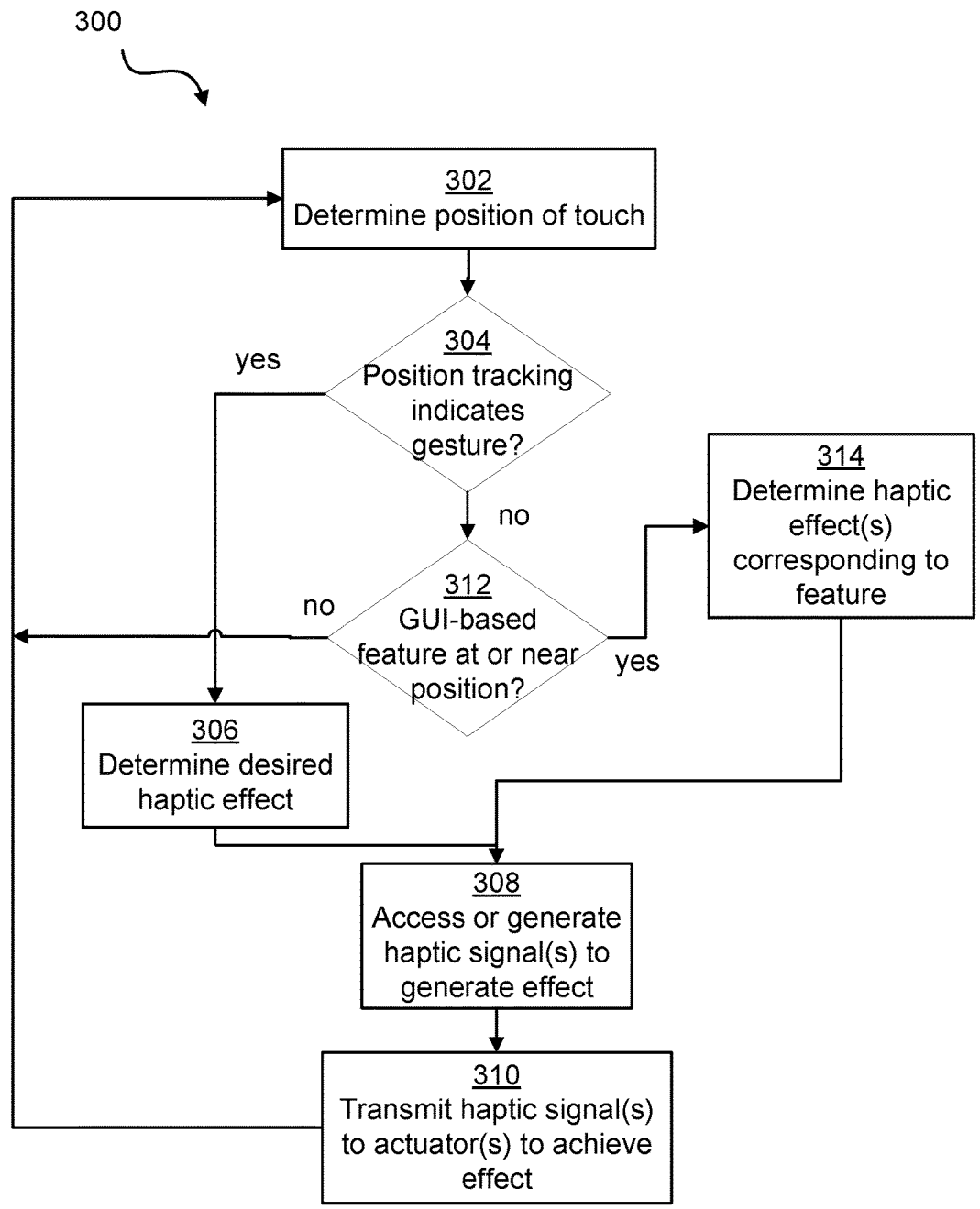
FIG. 3 is a flowchart showing an illustrative method for providing an interface with surface-based haptic effects

FIG. 3 is a flowchart showing an illustrative method 300 for providing an interface with surface-based haptic effects. Block 302 represents determining a position of a touch in a touch area. For example, a processor may utilize one or more sensors embedded in or viewing a touch-enabled display or surface to track a position of a touch on the surface. Based on the current and/or past position of the touch, an interaction with a graphical user interface mapped to the touch area can be determined. Based on the interaction, one or more haptic effects can be selected, such as varying the friction of the touch surface and/or other effects.

In this example, the interaction is recognized at block 304 and 312, where the method determines first, at 304, whether a gesture is indicated. A gesture can be recognized as a sequence of one or more touches or patterns of touch, such as based on a direction and length of a swipe across the screen, a sequence of discrete touches in a pattern, or another recognizable interaction. In this example, if a gesture is recognized, flow moves to block 306, which represents determining a desired haptic effect associated with the gesture.

For example, a "Z"-shaped touch trajectory may be recognized as a type of input gesture based on pattern recognition carried out by a processor of the device while the gesture is in progress. One or more haptic effects may be associated with the "Z"-gesture in data accessible to the processor indicating an effect to output while the gesture is in progress and/or after the gesture is complete. For example, the data may provide for the surface to take on a texture or a change in friction as the gesture nears completion. Additionally or alternatively, a texture or coefficient of friction of the display may change after the gesture is recognized in order to confirm input of the gesture.

If at block 304 a gesture is not recognized, flow moves to block 312, in which the method evaluates whether a GUI-based feature is present at or near the position of the touch. As discussed herein, various features can be present in a graphical user interface mapped to the touch surface, and the features can be associated with haptic effects. The features may or may not correspond to content actually displayed in the graphical user interface. Block 312 represents determining if one or more of such features are at the touched location or near the touched location and block 314 represents determining one or more haptic effects corresponding to the feature.

For example, the current pixel location and/or a projected pixel location for the touch based on a velocity of the touch can be compared to a bitmap specifying haptic effects for various pixel positions. Based on the haptic effect(s), suitable haptic signals can be accessed/generated to provide the output specified in the bitmap.

As another example, a current or projected location of a touch can be compared to data identifying the location of GUI features such as controls, textual content, boundaries, and the like. Then, if a GUI feature is identified at the location, data associating one or more haptic effects to the feature can be accessed. For instance, a processor may track the location of a touch and determine the touch is at or approaching a position in the touch area mapped to a particular control (e.g., a button) in the graphical user interface. The processor can then consult a listing of interface elements to determine a haptic effect (e.g., a texture, a friction variation) associated with the button and, based on the haptic effect, take further actions to generate the haptic effect.

In this example, both blocks 306 and 314 lead to block 308, which represents accessing or generating one or more haptic signals to generate the selected haptic effect(s). For example, a processor may access drive signals stored in memory and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

Block 310 represents transmitting the haptic signal to the actuator(s) to generate the desired effect(s). For instance, if an analog drive signal is to be provided, a processor can utilize an onboard D/A converter to create the signal. If a digital command is provided to the actuator, an appropriate message can be generated by an I/O bus of the processor. The haptic effect may be felt at the point of the touch and/or elsewhere. For example, if a two-finger input gesture is provided, the texture/coefficient of friction at the first finger may be changed in response to recognizing movement of the second finger.

In some embodiments, a baseline haptic signal may be sent to the actuator(s) to generate an ambient haptic effect even in the absence of a selected haptic effect in order to enhance the range of potential effects the device can produce. Thus, transmitting a haptic signal may comprise sending a "stop" command, a "zero" or minimal signal, or another signal to the actuator to reduce intensity as appropriate.

As an example, use of certain actuators, such as piezoelectric actuators, may allow for reduction in the coefficient of friction of a touch surface but not an increase in the coefficient of friction. To provide a range of options, a baseline signal may be provided so that the "ordinary" friction level of the touch surface is below the coefficient of friction the touch surface would have when static. Accordingly, haptic effects may be defined with respect to the baseline, rather than static, value. If maximum friction is desired, a "zero" signal may be sent to the piezoelectric actuator to stop movement of the surface.

Surface-based haptic effects may take any suitable form. For example, some haptic effects may comprise variations in the friction of the touch surface—some portions may be rendered "slicker" or "rougher" than others. As another example, vibrotactile effects may be used, such as vibrations or series of vibrations. Vibrotactile effects and/or variations in friction may be used to simulate the feeling of distinct features, such as boundaries or obstacles. For example, a boundary or edge may be simulated by an increase in friction, with the friction decreasing if the boundary is crossed (in some instances).

Vibrotactile effects and/or variations in friction may additionally or alternatively be used to simulate various textures. Additional detail regarding generation and use of textures can be found in U.S. patent application Ser. Nos. 12/697,010, 12/697,042, and 12/697,037, referenced above and entitled "Systems and Methods for a Texture Engine," "Systems and Methods for Using Multiple Actuators to Realize Textures," and "Systems and Methods for Using Textures in Graphical User Interface Widgets," respectively. For instance, patterns of differing friction or patterns of vibration may be provided to mimic the feeling of textures such as brick, rocks, sand, grass, fur, various fabric types, water, molasses, and other fluids, leather, wood, ice, lizard skin, metals, and other texture patterns. Other textures not analogous to real-world textures may also be used, such as high-magnitude vibrotactile or other feedback when a "danger" texture is desired.

Although in this example blocks 304 and 312 were considered in the alternative, in some embodiments a method can consider whether a gesture is in progress while also evaluating whether the touch is occurring at a location mapped to a portion of a GUI having one or more tactile features.

Additional Illustrative Embodiments of Interface Behavior

Figure 4A:
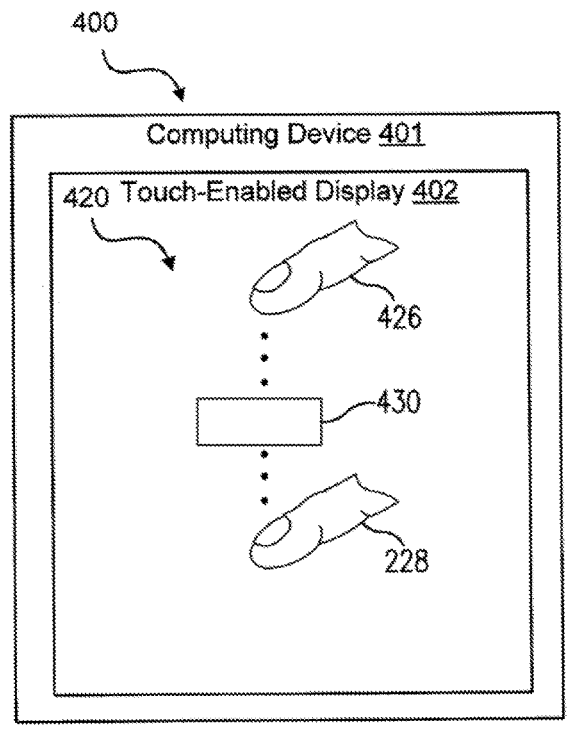
FIG. 4A is a diagram illustrating an external view of a system comprising a computing device that features a touch-enabled display.
Figure 4B:
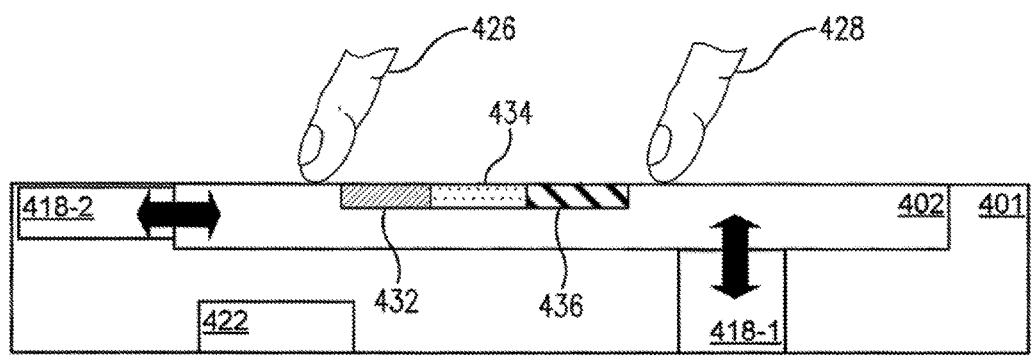
FIG. 4B shows a cross-sectional view of the device of FIG. 4A.

FIG. 4A is a diagram illustrating an external view of a system 400 comprising a computing device 401 that features a touch-enabled display 402. FIG. 4B shows a cross-sectional view of device 401. Device 401 may be configured similarly to device 101 of FIG. 1A, though components such as the processor, memory, sensors, and the like are not shown in this view for purposes of clarity.

As can be seen in FIG. 4B, device 401 features a plurality of actuators 418 and an additional actuator 422. Actuator 418-1 may comprise an actuator configured to impart vertical force to display 402, while 418-2 may move display 402 laterally. In this example, the actuators are coupled directly to the display, but it should be understood that the actuators could be coupled to another touch surface, such as a layer of material on top of display 402. Additional actuator 422 may be coupled to a housing containing the components of device 401. In the examples of FIGS. 4A-4D, the area of display 402 corresponds to the touch area, though the principles could be applied to a touch surface completely separate from the display.

In one embodiment, actuators 418 each comprise a piezoelectric actuator, while additional actuator 422 comprises an eccentric rotating mass motor, a linear resonant actuator, or another piezoelectric actuator. Actuator 422 can be configured to provide a vibrotactile haptic effect in response to a haptic signal from the processor. The vibrotactile haptic effect can be utilized in conjunction with surface-based haptic effects and/or for other purposes.

In some embodiments, either or both actuators 418-1 and 418-2 can comprise an actuator other than a piezoelectric actuator. Additionally, a single actuator 422 is shown, although multiple other actuators can be coupled to the housing of device 401 and/or other actuators 422 may be coupled elsewhere. Device 401 may feature multiple actuators 418-1/418-2 coupled to the touch surface at different locations, as well.

Turning back to FIG. 4A, a graphical user interface is shown at 420 to include a generalized feature 430. In this example, a haptic effect is selected for output based on the position of a touch represented by movement of finger 426 downward to position 428. Particularly, as can be seen in FIG. 4B, actuators 418-1, 418-2, and/or 422 are provided with appropriate haptic signals to provide surface-based haptic feedback as indicated at 432, 434, and 436. The different cross-hatching is intended to represent different "feel" of the touch surface due to the actuators. For instance, 432, 434, and 436 can represent variations in the texture or coefficient of friction of the touch surface that generate the desired haptic effect. In one embodiment, the feeling of a box can be simulated by having a first area 432 of higher friction followed by a second area 434 of lower friction and a third area 436 of higher friction.

Figure 4C:
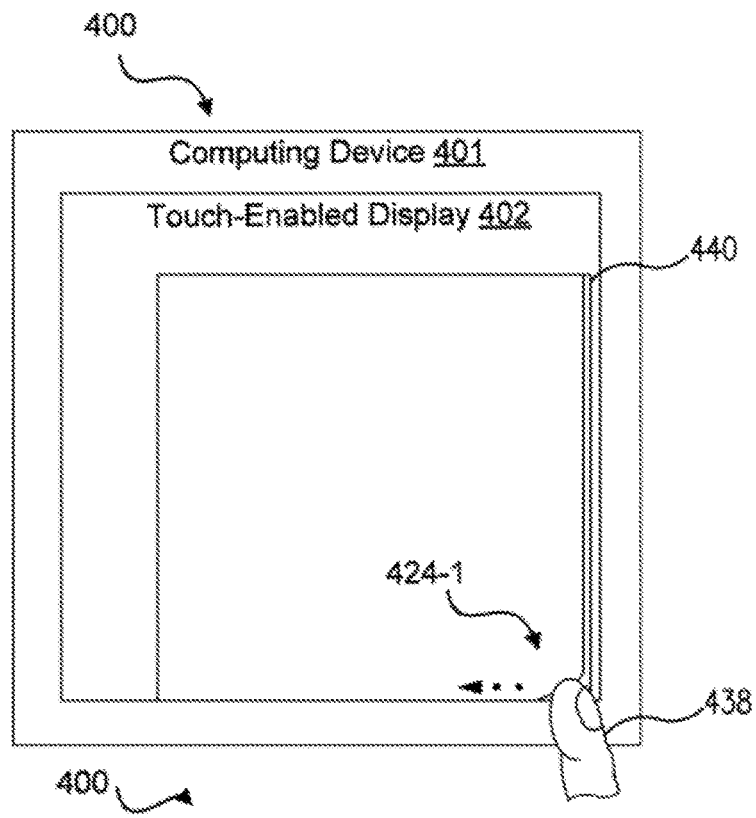
FIGS. 4C-4D provides an example of a graphical user interface in the device of FIG. 4A as the processor is configured to select a haptic effect in response to recognizing a page turn input gesture.
Figure 4D:
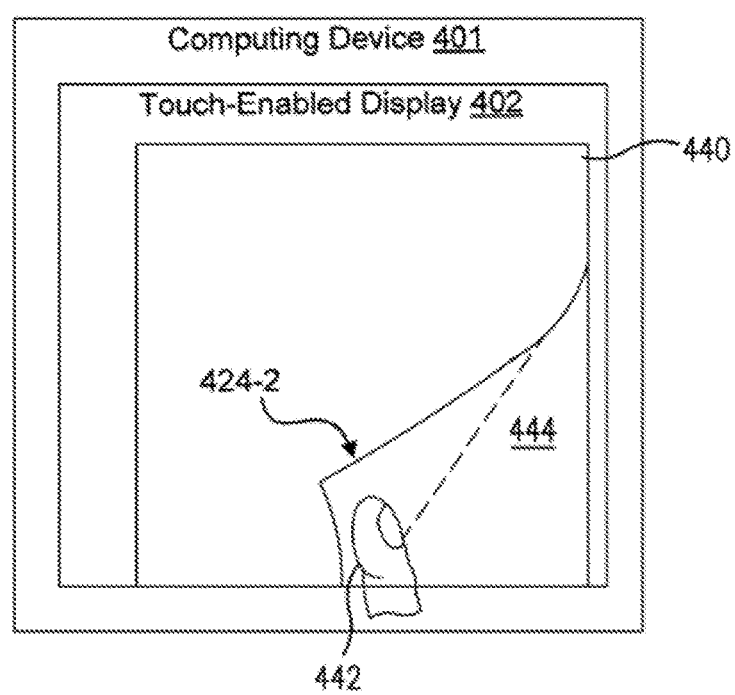

FIGS. 4C-4D provides an example of a graphical user interface 424 as the processor is configured to select a haptic effect in response to recognizing a page turn input gesture, with the haptic effect selected to vary the touch surface in the direction of the page turn input gesture as the gesture is provided. FIG. 4C shows a first interface state 424-1 in which a finger 438 touches an onscreen representation of a stack of pages 440.

As shown at 442 in FIG. 4D, the finger has provided a right-to-left input gesture. In this example, software of computing device 401 configures the processor to recognize a right-to-left trajectory beginning from a page corner as a page turn input gesture. Thus, the interface moves to state 424-2 where the page corner is lifted and the next page is visible at 444. Additionally, as the gesture is in progress (and/or after the gesture is recognized), a surface-based haptic effect can be provided. For example, as finger 438 moves from right to left, the coefficient of friction of the touch surface can be varied (e.g., by increasing) to simulate the feel of a page turn. As another example, a series of friction changes can be provided, or one or more texture changes may occur.

Figure 5A:
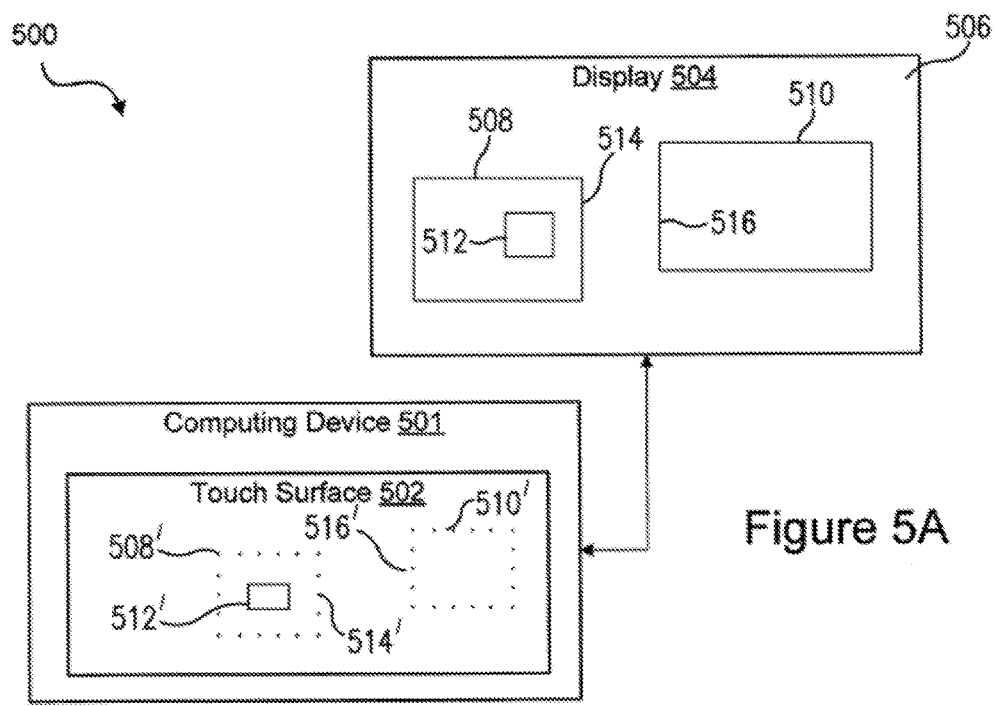
FIGS. 5A-5B each illustrate a system comprising a computing device featuring a touch surface and interfaced to a separate display.
Figure 5B:
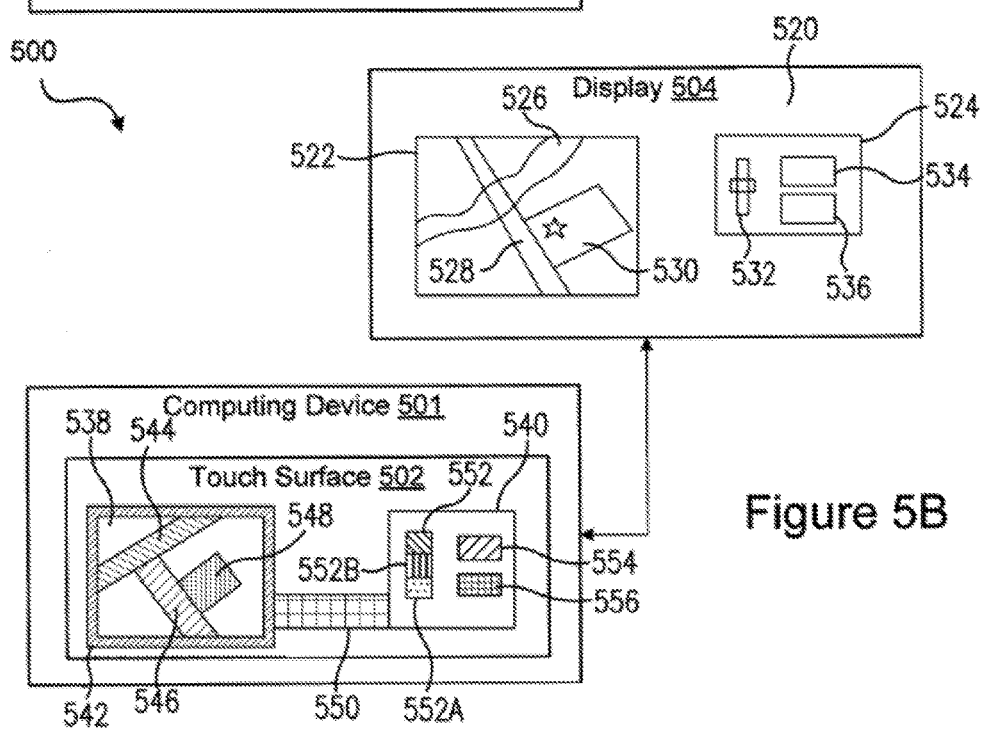

FIGS. 5A-5B each illustrate a system 500 comprising a computing device 501 featuring a touch surface 502. Computing device 501 can be configured similarly to devices 401 and 101 of FIGS. 4 and 1. In these examples, touch surface 502 is separate from a display that features a graphical user interface mapped to the touch area. A separate display 504 is shown in FIGS. 5A-5B and interfaced to device 501.

For example, device 501 may represent a computing device interfaced to display 504, such as a laptop computer with a built-in trackpad corresponding to the touch surface. As another example, computing device 501 may itself be a peripheral device including the touch surface 502, actuators, and suitable processing circuitry commanded by a computing device to which device 501 is interfaced. In any event, it will be understood that the principles discussed in FIGS. 5A-5B are equally applicable to embodiments in which the touch surface corresponds to the display or a material above the display. Additionally, the principles can, of course, be used when a touch surface is separate from a display (e.g., a touch surface on a mouse, computer trackpad, etc.).

Turning to FIG. 5A, in this example the processor of device 501 is configured to select a haptic effect in response to recognizing a gesture indicating movement of an on-screen content item from a first location to a second location. Graphical user interface 506 includes windows 508 and 510. Element 512 may represent a file, folder, or other element that can be manipulated on screen. These elements are each mapped to respective locations shown at 508', 510', and 512' in the touch area as defined by touch surface 502. A user may position a finger or other object at or near 512' and touch surface 502. This input can be recognized as selection of item 512. Area 512' may have a distinct texture or other haptic effect associated with the content or identity of item 512 in some embodiments.

To move item 512 to window 510, the user may drag across touch surface 502 across borders 514' and 516', corresponding to borders of windows 508 and 510 in interface 506. If the second location (window 510 in this example) corresponds to a protected area (e.g., a system or other secured folder), an appropriate surface-based haptic effect may be provided as border 516' is approached or crossed. As another example, if element 512 represents a protected file, haptic effects may be provided at or near border 514'. For instance, the coefficient of friction may be increased significantly to discourage movement out of window 508 and/or into window 510. As another example, the status of element 512 may be indicated by a particular texture at area 512' or a particularly high coefficient of friction when a movement begins from area 512' as compared to movement of other, non-protected elements (not shown).

FIG. 5B illustrates an example where the processor is configured to select a haptic effect based on a control displayed in the graphical user interface at a location mapped to a position in the touch area at or near the position of the touch. Additionally, haptic effects based on additional content are shown.

Particularly, graphical user interface 520 includes a first portion 522 displaying content and a second portion 524 featuring on-screen controls. In this example, content portion 522 features a map with a major road 526, minor road 528, and a destination 530. Control portion 524 includes a slider 532 and buttons 534 and 536. Any suitable graphical control elements can be used, including, but not limited to, checkboxes, radio buttons, drop-down menus, accordion menus, dials, and the like.

Graphical user interface 520 is mapped to the area of touch surface 502. In this example, touch surface 502 is illustrated to provide a number of surface-based haptic effects. Although illustrated simultaneously, it will be understood that the various haptic effects indicated by cross-hatching will be provided by device 501 as a touch is at or near the area containing the effect.

As shown at 538, the portion of the touch area mapped to content portion 522 features a border 538. The border may comprise a texture or friction variation to help indicate the boundaries of the portion mapped to content portion 522. Additionally, surface effects are provided at 544 and 546 to identify major road 526 and minor road 528.

For example, different types of road and other map features may have distinct textures or friction levels. As another example, an on-screen route may be displayed in content portion 522. Portions of touch surface 502 mapped to the route may have a different friction or texture than portions corresponding to roads off of the route. For example, a user may be able to trace the route by following low-friction portions 544 and 546, with friction increasing past location 548. Location 548, as the intended destination, may have a unique friction or texture.

Touch surface 502 features a portion 550 representing a haptic effect that may serve to guide a user toward a portion of the touch area mapped to control portion 524. For example, portion 550 may feature a lower coefficient of friction to allow an easy path to the controls.

As shown at 552A, 552B, and 552C, different haptic effects are provided as the value of slider 532 increases. For example, the friction level may change as the slider is moved upward or downward. As another example, buttons 534 and 536 may feature distinct border areas signified by different textures or simulated by friction variances. In some embodiments, the texture or friction of buttons 534 and 536 varies based on a value or state of the button. Haptic effects in addition to texture and/or friction can be provided as well. For example, as a user moves into/from a button, a haptic pop or vibration may be provided.

Other Illustrative Embodiments of Surface-Based Effects

The examples above were provided for purposes of illustration and are not intended to be limiting. Additional examples of surface-based haptic effects are discussed below.

In some embodiments, surface-based effects are provided independently of a mapping to a graphical user interface. For example, a touch surface may be used to provide inputs to manipulate graphical elements in a three-dimensional environment presented in the graphical user interface. Different textures may be provided to indicate different controls or motions—for example a first texture (or friction) along the x axis in the touch surface may indicate translation in an x-y plane in the 3-D environment, while a second texture (or friction) along the x-axis may indicate translation in an x-z plane of the 3-D environment. As another example, manipulation of an object in the 3-D environment may be indicated by varying textures or friction along multiple contact points of the touch surface.

As a further example, different textures can be used to indicate different type of control actions. For example, in a computer aided design (CAD) or 3-D environment, a first texture may be provided when moving an element or object in the environment, while a second texture is provided when the view is changed but the element/object is not moved.

Still further, embodiments include changes in texture associated with drawing or other input. For example, in a design application, different brushes or other tools can have corresponding textures. As a brush size is changed, the brush size may be "felt" by providing a different texture with each brush size and/or by mapping the brush texture to a larger portion of the touch area.

Embodiments include the use of texture, friction, and/or other haptic effects in accordance with the present subject matter in order to indicate the contents of a file or document. For example, a user interface may include a timeline selection mechanism (e.g., a slider) that includes surface-based haptic effects. For instance, an audio file may be analyzed for one or more characteristics (e.g., volume) and surface-based haptic effects mapped to the characteristics (e.g., different textures, friction levels, etc. for different volumes). As the user interacts with the selection mechanism, different haptic effects can be provided (e.g., the slider feels different when portions of increased volume are encountered).

As another example, surface-based haptic effects may be used in conjunction with games. For example, U.S. Patent Application Publication No. 2008/0064499, which is incorporated by reference herein in its entirety, describes the use of haptic effects with casino and other games. Surface-based haptic effects may be used in addition to or instead of effects described therein, such as different frictions/textures when playing cards, game instruments (e.g., roulette wheel, dice, etc.) are interacted with via the touch surface and/or to indicate results or game rules (e.g., different texture when a user advances, different friction values used to indicate when a prohibited move is made in a game, etc.).

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
a processor in communication with a haptic output device, configured to:
identify text displayed in a display area associated with a touch surface responsive to a search query;
highlight the identified text displayed in the display area;
determine a haptic effect to generate based on identifying a position of a touch and the highlighted identified text, wherein the haptic effect is configured to adjust a coefficient of friction of the touch surface; and
output a haptic signal associated with the haptic effect to the haptic output device, the haptic output device configured to output the haptic effect while the touch is occurring.

2. The system of claim 1, wherein the haptic output device comprises one or more of: an ultrasonic actuator or an electrostatic actuator.

3. The system set forth in claim 1, wherein the processor is further configured to determine the haptic effect based on a control displayed in a graphical user interface at a location mapped to a position in the touch surface at or near the position of the touch.

4. The system set forth in claim 1, wherein the processor is further configured to determine the haptic effect in response to recognizing a page turn input gesture, the haptic effect determined to vary the coefficient of friction in a direction of the page turn input gesture as the gesture is provided.

5. The system set forth in claim 1, wherein the processor is configured to determine the haptic effect in response to recognizing a gesture indicating movement of an on-screen content item from a first location to a second location.

6. The system of claim 1, wherein an adjustment of the coefficient of friction of the touch surface comprises increasing the coefficient of friction of the touch surface.

7. The system of claim 1, wherein selecting a haptic effect to generate further comprises determining a haptic value associated with one or more pixels at the position of the touch.

8. A method, comprising:
- identifying text displayed in a display area associated with a touch surface responsive to a search query;
- highlighting the identified text displayed in the display area;
- determining a haptic effect to generate based on identifying a position of a touch and the highlighted identified text, wherein the haptic effect is configured to adjust a coefficient of friction of the touch surface; and
- outputting a haptic signal associated with the haptic effect to a haptic output device, the haptic output device configured to output the haptic effect while the touch is occurring.

9. The method of claim 8, wherein the haptic output device comprises one or more of: an ultrasonic actuator or an electrostatic actuator.

10. The method of claim 8, further comprising determining the haptic effect based on a control displayed in a graphical user interface at a location mapped to a position in the touch surface at or near the position of the touch.

11. The method of claim 8, further comprising determining the haptic effect in response to recognizing a page turn input gesture, the haptic effect determined to vary the coefficient of friction in a direction of the page turn input gesture as the gesture is provided.

12. The method of claim 8, further comprising determining the haptic effect in response to recognizing a gesture indicating movement of an on-screen content item from a first location to a second location.

13. The method of claim 8, wherein selecting a haptic effect to generate further comprises determining a haptic value associated with one or more pixels at the position of the touch.

14. The method set forth in claim 8, wherein the touch comprises adjusting an on-screen control and the haptic effect is selected based on a value of the on-screen control.

15. The method of claim 8, wherein an adjustment of the coefficient of friction of the touch surface comprises increasing the coefficient of friction of the touch surface.

16. A non-transitory computer-readable medium embodying program code, which when executed by a processor is configured to cause the processor to:
- identify text displayed in a display area associated with a touch surface responsive to a search query;
- highlight the identified text displayed in the display area;
- determine a haptic effect to generate based on identifying a position of a touch and the highlighted identified text, wherein the haptic effect is configured to adjust a coefficient of friction of the touch surface; and
- output a haptic signal associated with the haptic effect to a haptic output device, the haptic output device configured to output the haptic effect while the touch is occurring.

17. The non-transitory computer readable medium of claim 16, wherein selecting a haptic effect to generate further comprises determining a haptic value associated with one or more pixels at the position of the touch.

18. The non-transitory computer readable medium of claim 16, further comprising program code which when executed by the processor is configured to cause the processor to: determine the haptic effect in response to recognizing a gesture indicating movement of an on-screen content item from a first location to a second location.

19. The non-transitory computer readable medium of claim 16, wherein the haptic output device comprises one or more of: an ultrasonic actuator or an electrostatic actuator.

20. The non-transitory computer readable medium of claim 16, wherein adjusting the coefficient of friction of the touch surface comprises increasing the coefficient of friction of the touch surface.

* * * * *